(12) United States Patent
Howard (10) Patent No.: US 8,728,555 B1
(45) Date of Patent: May 20, 2014

(54) APPARATUS AND METHOD FOR SEARING, BRANDING, AND COOKING

(76) Inventor: David Howard, Kellyville, OK (US)

(*) Notice: Subject to any disclaimer, the term of this patent is extended or adjusted under 35 U.S.C. 154(b) by 801 days.

(21) Appl. No.: 12/631,497

(22) Filed: Dec. 4, 2009

(51) Int. Cl.
*A23C 3/00* (2006.01)

(52) U.S. Cl.
USPC ........... 426/523; 426/383; 426/520; 426/509; 426/510; 99/443 C; 99/330; 99/485

(58) Field of Classification Search
USPC .................. 426/383, 523; 99/443 C, 330, 485
See application file for complete search history.

(56) References Cited

U.S. PATENT DOCUMENTS

| | | | | |
|---|---|---|---|---|
| 1,965,576 A | * | 7/1934 | Clement | 159/23 |
| 4,281,026 A | * | 7/1981 | Reale | 426/599 |
| 4,660,542 A | * | 4/1987 | Scherer | 126/378.1 |
| 6,234,066 B1 | * | 5/2001 | Zittel et al. | 99/348 |
| 6,244,168 B1 | * | 6/2001 | van de Vorst et al. | 99/443 C |
| 6,743,454 B1 | * | 6/2004 | Gibson et al. | 426/243 |
| 2001/0043974 A1 | | 11/2001 | Linford et al. | |
| 2006/0260477 A1 | | 11/2006 | Jackman et al. | |

OTHER PUBLICATIONS

"Printouts from the Heat and Control Website", Sep. 2, 2008, Published in: US.

* cited by examiner

*Primary Examiner* — Drew Becker
*Assistant Examiner* — Preston Smith
(74) *Attorney, Agent, or Firm* — GableGotwals (57) ABSTRACT

An apparatus and method for continuously searing and/or branding the surface of and continuously cooking a food product wherein the cooking oven is different from the searing and/or branding apparatus. At least a portion of the vapor product produced in the searing and/or branding apparatus is preferably delivered into the oven such that the food product is cooked in an environment comprising the vapor product from the searing and/or branding apparatus. The vapor extraction rate from the searing and/or branding apparatus is also preferably controlled to maintain a desired vapor product temperature in or flowing from the searing and/or branding apparatus.

28 Claims, 3 Drawing Sheets

APPARATUS AND METHOD FOR SEARING, BRANDING, AND COOKING

FIELD OF THE INVENTION

The present invention relates to apparatuses and methods for searing, branding, and/or cooking food products.

BACKGROUND OF THE INVENTION

Chicken, beef burger patties, sausage patties, onions, mushrooms, salmon, and other meat, fish, poultry and vegetable products are often precooked in continuous linear impingement ovens or convection ovens prior to being sold to restaurants, food services, supermarkets, or consumers. However, the precooked products produced by these continuous industrial ovens typically lack the color, appearance, taste, and other characteristics of products which are grilled or cooked at home or at a restaurant from scratch.

In an attempt to address this problem, continuous apparatuses for searing and/or branding the surface of the product are sometimes used upstream of the continuous cooking oven. Such apparatuses typically comprise: (a) a direct flame or infrared searing section which browns, chars, and/or seals the product surface and/or (b) a rotary brander which contacts the product to leave branded stripes on the product surface which are intended to resemble grill marks. A continuous apparatus which both sears and brands the product surface is sometimes referred to in the art as a flame grill system.

The searing section of a brander/searer apparatus will typically comprise: (a) a series of upper searing burners (e.g., blue ribbon flame burners or gas infrared burners), each of which extends laterally across the top of the product conveyor belt for discharging heat (preferably flame) downwardly onto the top of the product and (b) a series of lower searing burners, each of which extends laterally beneath the conveyor for discharging heat (preferably flame) upwardly onto the bottom of the product.

Heretofore, the focus of the searing section has simply been the direct application of high intensity heat (typically flame at 1000°-2000° F. or more) to the surfaces of the product as the product is briefly positioned below or above each searing burner. When the product is directly exposed to such heat as it passes beneath or over a searing burner, the temperature of the immediate outer surface of the product can reach as much as 550° F. or more. Different surface finishes can be produced to some degree in the searing section by changing the number, angle, height, and/or energy output of the burner(s). Alternatively, or in addition, the degree or nature of the surface finish can be altered by adjusting the belt speed in order to increase or decrease the product residence and exposure time below or beneath each burner.

The brander/searer apparatus and method heretofore used in the art therefore differ significantly from the apparatus and method provided by and used in my invention as discussed below. Because the prior art searers have, for obvious reasons, simply focused on the application of the high heat burner flames to the product, which, by itself, already produces an outermost surface temperature of 550° F. and above, no emphasis or attention has been given, nor has it been apparent that any benefit would be obtained by, retaining any particular amount of the searing/branding vapor product within the burner/searer housing or by otherwise increasing and controlling the temperature of the accumulated vapor product in the housing. Rather, concerning the vapor product produced in the high heat searing/branding process, the emphasis heretofore has simply been on ensuring that the product vapor will always be permitted to flow out of the apparatus in a sufficiently expeditious manner to guarantee that no overheating of the equipment will ever be allowed to occur and to minimize vapor flow out of the conveyor inlet and outlet openings.

The branding section of the prior art brander/searer apparatus typically houses a rotary branding system comprising: a rotating shaft which extends laterally over the product conveyor; a series of side-by-side fixed branding rings or "free-floating" branding rings which are retained on the rotating shaft such that the series of rings extends laterally across the width of the product conveyor; spacers which are optionally installed between adjacent pairs of any free-floating rings such that the spacers keep the branding rings in proper spaced alignment but the spacers do not contact the food product; one or more heating elements (typically at least one blue ribbon flame burner) which preferably heat the metal branding rings sufficiently to cause them to glow cherry red; and a motor or other device or system which drives the rotation of the rotating shaft. As the food product is conveyed beneath the brander, the hot branding rings contact the surface of the product and leave branded stripes intended to resemble grill marks.

Unfortunately, the current brander/searer apparatuses and the current systems in which they are used have many significant shortcomings and deficiencies. For example, the branded stripes, color, and highlights produced on the product surface by the continuous brander/searer apparatuses and methods currently used in the art do not sufficiently resemble authentic grill marks, color, and highlights as would be produced by a home grill. Rather, the branded stripes have an appearance which is commonly described as resembling painted tattoo marks and the color and degree of darkness produced between the stripes are typically too light and/or otherwise unauthentic. Also, each individual product piece produced by a current brander/searer apparatus and method will typically have essentially the same stripe pattern and appearance as the next.

Moreover, for these and further reasons, the existing systems employed in the industry comprising a continuous industrial branding and/or searing apparatus followed by a continuous industrial cooking oven also have not been effective for producing cooked products having the same flavor, color, and highlights as products grilled or cooked from scratch at home or in restaurants. In addition to the deficiencies of the branding/searing stage of the prior art apparatuses and methods as discussed above, the product is also deprived in the oven cooking stage of the beneficial flavor development processes which otherwise occur when the product is cooked entirely from scratch in a single, non-continuous piece of equipment as all of the product's own fats and juices evaporate and caramelize around it.

Also, a further important shortcoming of the systems currently used in the art for continuously searing, branding, and then cooking food products is that they consume an undesirably excessive amount of energy. In addition to the comparatively intense heating requirements of the brander/searer apparatus, the oven apparatus employed in the cooking stage must also be independently heated for cooking the interior of the product.

SUMMARY OF THE INVENTION

The present invention provides a greatly improved apparatus and method for continuously searing and/or branding the surface of and continuously cooking a food product. The inventive apparatus and method satisfy the needs and address and alleviate the problems discussed above. Although the reasons for the unexpected and surprising success of the present invention are not known with complete certainty, the inventive apparatus and method provide very significant improvements in product flavor, color, highlights, and grilled appearance while also reducing energy consumption and operating costs.

In one aspect, there is provided a method of searing and cooking a food product comprising the steps of: (a) searing a surface of the food product by continuously delivering the food product through a searing apparatus, wherein in the step of searing a vapor product is also produced in the searing apparatus; (b) cooking the food product by continuously delivering the food product through an oven which is different from the searing apparatus; and (c) delivering at least a portion of the vapor product from the searing apparatus into the oven such that the food product is cooked in the oven in step (b) in an environment comprising at least a portion of the vapor product from the searing apparatus.

In another aspect, there is provided a method of branding and cooking a food producing comprising the steps of: (a) branding the surface of the food product to produce char marks thereon by continuously delivering the food product through a branding apparatus, wherein in the step of branding a vapor product is also produced in the branding apparatus; (b) cooking the food product by continuously delivering the food product through an oven which is different from the branding apparatus; and (c) delivering at least a portion of the vapor product from the branding apparatus into the oven such that the food product is cooked in the oven in step (b) in an environment comprising at least a portion of the vapor product from the branding apparatus.

In another aspect, there is provided a method of searing and branding a food product comprising the steps of: (a) searing a surface of the food product by continuously delivering the food product through a searing and branding apparatus comprising a conveyor which conducts the food product through the searing and branding apparatus and at least one searing burner positioned in the searing and branding apparatus adjacent to the conveyor which discharges heat toward the food product; (b) branding the surface of the food product with a brander positioned in the searing and branding apparatus; (c) extracting from the searing and branding apparatus, at an extraction rate, a searing and branding vapor product produced in steps (a) and (b); and (d) automatically controlling the extraction rate to maintain a selected temperature condition of the vapor product. The method also preferably further comprises the step of selecting the selected temperature condition of the vapor product to produce a desired color of the surface of the food product, a desired darkness of the surface of the food product, a desired flavor of the food product, or a combination thereof.

In another aspect, there is provided an apparatus for searing and cooking a food product. The apparatus comprises: (a) a searing assembly comprising a searing assembly housing, a searing assembly conveyor for continuously conveying the food product through the searing assembly housing, and at least one searing burner positioned in the searing assembly housing for searing a surface of the food product as the food product is conveyed through the searing assembly housing by the searing assembly conveyor, wherein when the surface of the food product is seared by the searing burner, a vapor product will also be produced in the searing assembly housing; (b) a spiral oven comprising a spiral oven housing and a conveyor for continuously conveying the food product within the spiral oven housing in a spiral pattern; and (c) a vapor conduit extending between the searing assembly housing and the spiral oven housing for delivering at least a portion of the vapor product from the searing assembly housing into the spiral oven housing such that the food product can be cooked in the spiral oven in an environment comprising at least a portion of the vapor product from the searing assembly.

In another aspect, there is provided an apparatus for branding and cooking a food product. The apparatus comprises: (a) a branding assembly comprising a branding assembly housing, a branding assembly conveyor for continuously conveying the food product through the branding assembly housing, and a rotary brander positioned in the branding assembly housing for contacting and branding char marks on a surface of the food product as the food product is conveyed by the branding assembly conveyor, wherein as the food product is conveyed through the branding assembly housing a vapor product will also be produced; (b) a spiral oven comprising a spiral oven housing and a conveyor for continuously conveying the food product within the spiral oven housing in a spiral pattern; and (c) a vapor conduit extending between the branding assembly housing and the spiral oven housing for delivering at least a portion of the vapor product from the branding assembly housing into the spiral oven housing such that the food product can be cooked in the spiral oven in an environment comprising at least a portion of the vapor product from the branding assembly.

In another aspect, there is provided an improvement to a rotary brander of the type comprising an elongate rotatable shaft having a plurality of branding elements thereon, the branding elements having substantial circular outer edges for contacting and producing char stripes resembling grilling marks on food products, and the char stripes having a first directional orientation. The improvement comprises a plurality of branding pieces attached to at least some of the branding elements at the substantially circular outer edges such that the branding pieces will also contact the food products and will produce char marks on the food products at one or more orientations different from the first directional orientation.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
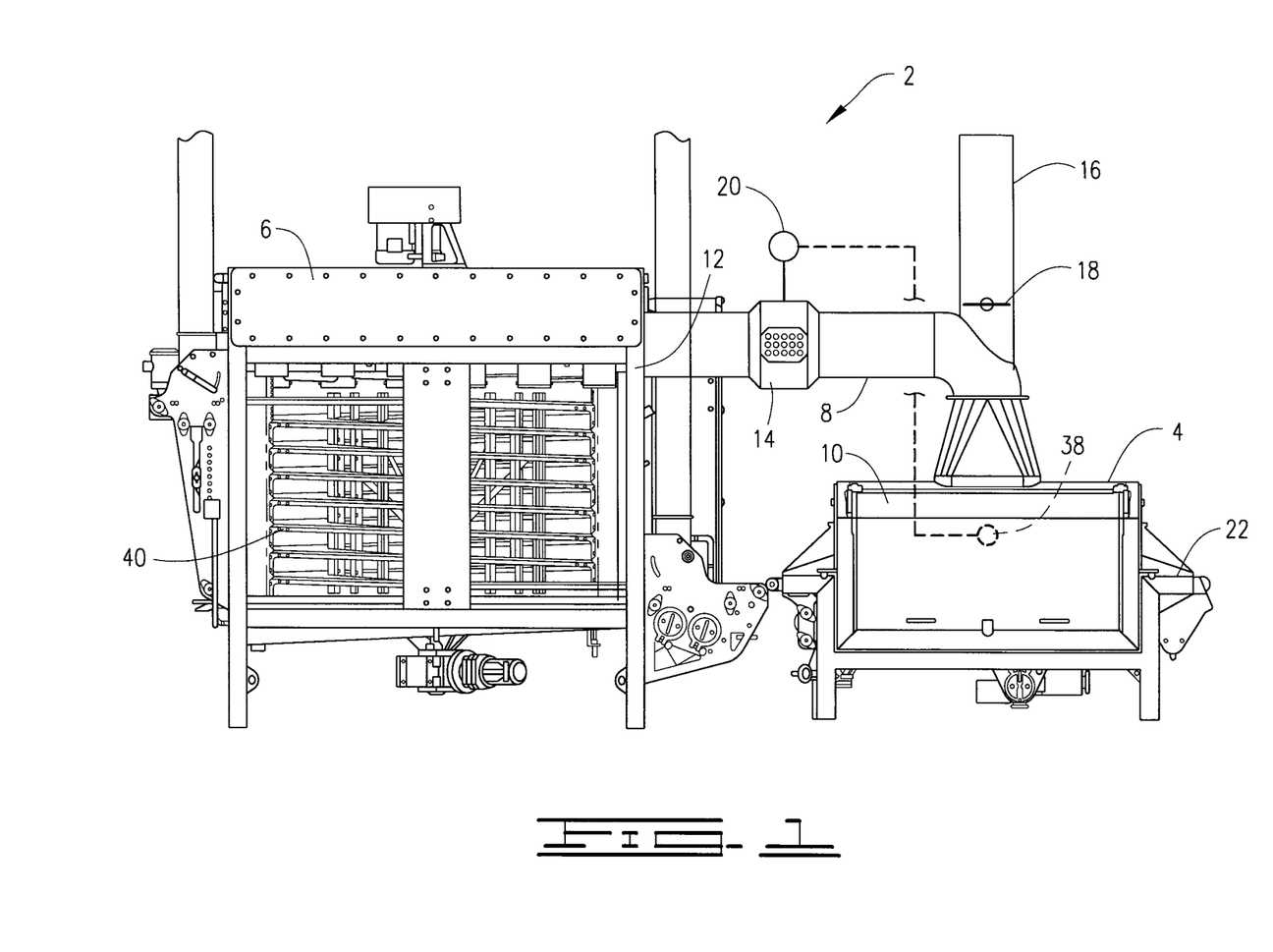
FIG. 1 illustrates an embodiment 2 of the inventive apparatus comprising a continuous searing and/or branding apparatus 4 (alternatively referred to herein and in the claims as a searing and/or branding assembly) positioned upstream of (i.e., prior to) a continuous oven 6.

An embodiment 2 of the inventive system for continuously searing and/or branding the surface of a food product and then continuously cooking the food product is illustrated in FIG. 1. The inventive system 2 comprises: an apparatus 4 for searing, branding, or both searing and branding the food product; an oven 6 for cooking the food product; a vapor conduit 8 extending between the housing 10 of the searing and/or branding apparatus 4 and the housing 12 of the oven 6 for delivering at least a portion of the vapor product generated by the searing and/or branding process into the interior of the oven 6; an extraction fan 14 positioned in the vapor conduit 8 for extracting the vapor product from the searing and/or branding apparatus 4 and delivering at least a portion thereof to the oven 6 via the vapor conduit 8; a bypass duct 16 having a damper 18 positioned therein for allowing at least a portion of the product vapor produced by the searing and/or branding apparatus 4 to be discharged to the atmosphere or to other processing units; and a controller 20 for automatically controlling the rate of vapor extraction from the searing and/or branding apparatus 4 in order to automatically maintain a desired operating temperature condition within the apparatus 4.

As used herein and in the claims, unless otherwise stated, the terms "searing apparatus" and "searing assembly" refer to and encompass any apparatus which can be used for searing, either alone or in combination with branding and/or other processes. Also, unless otherwise stated, the terms "branding apparatus" and "branding assembly" as used herein and in the claims refer to and encompass any apparatus which can be used for branding, either alone or in combination with searing and/or other processes.

The inventive system 2 can be used for processing any desired type of food product. Examples include, but are not limited to chicken, beef burger patties, sausage patties, brisket, rack of lamb, onions, peppers, mushrooms, salmon, and other meat, fish, poultry, vegetable and fruit products. In addition, although it will typically be preferred that the searing and/or branding apparatus 4 be positioned upstream of the oven 6 in order to capitalize on the benefits obtained by sealing the product surface prior to cooking, the searing and/or branding apparatus 4 can alternatively be positioned after the oven 6 such that the searing and/or branding product vapor will be delivered backwardly from the searing and/or branding apparatus 4 to the oven 6.

Figure 2:
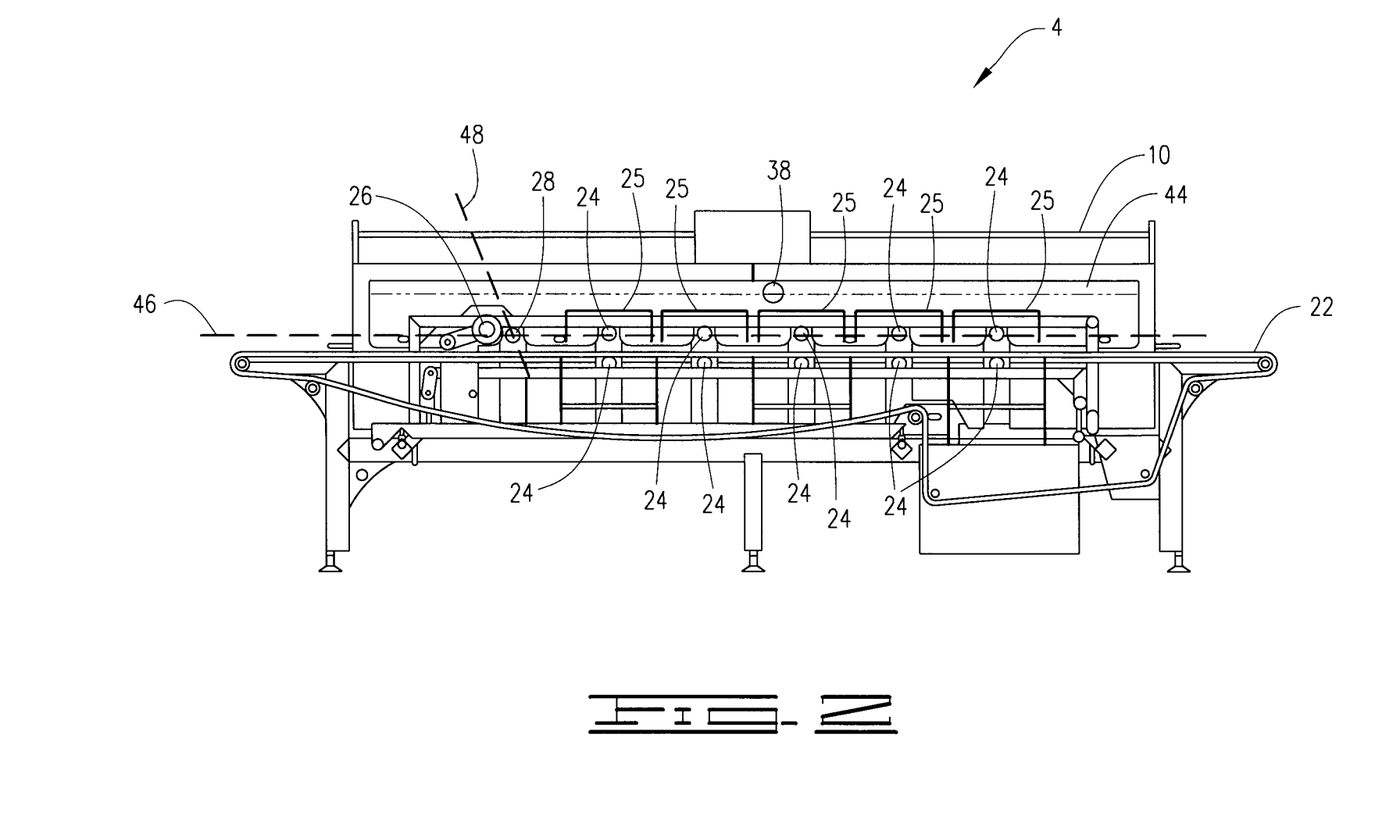
FIG. 2 is a cutaway elevational side view of a combination searing and branding apparatus 4 preferred for use in the inventive system 2.

The searing and/or branding apparatus 4 can be an assembly which (a) only includes one or more (preferably a plurality of) internal elements for searing the surface of the food product, (b) only includes one or more elements for branding the surface of the food product, or (c) includes internal components operable for both searing and branding the food product. The apparatus 4 will preferably be an assembly as illustrated in FIG. 2 which is operable for both searing and branding the product. Moreover, it will also be understood that searing and branding operations could alternatively be performed using separate continuous searing and branding apparatuses, or a compartmentalized apparatus, wherein vapor product from one or both of the apparatuses, or compartments, can be delivered to the cooking oven 6.

The brander/searer apparatus illustrated in FIG. 2 comprises: a conveyor 22 for continuously conveying the food product through the apparatus housing 10; one or more, preferably a plurality, of searing burners 24 positioned in the housing 10 above and/or below the conveyor 22; and at least one rotary brander 26 positioned within the housing 10 above and/or below the conveyor 22. Although other types of burners can also be used, each searing burner 24 will preferably be either a blue ribbon flame burner or a gas infrared burner which is positioned adjacent to the conveyor 22 and extends laterally above or below the conveyor 22 for searing the upper or lower surface of the food product. Further, as illustrated in FIG. 2, the brander/searer 4 can also optionally include interior heat retaining covers 25 (preferably open-bottomed box type covers) over some or all of the upper searing burners 24 positioned above the product conveyor 22.

As will be understood by those in the art, the rotary brander 26 is rotatably installed in the brander/searer housing 10 such that the rotary brander 26 extends laterally across and rotates at a speed corresponding to the speed of the conveyor 22. The rotation of the rotary brander 26 can be independently or dependently driven in conjunction with the conveyor 22 using a motor, belt, chain, or any other drive system known in the art. One or more blue ribbon flame burners or other heating elements 28 are preferably installed adjacent to the rotary brander 26 for heating the contacting elements of the rotary brander 30 to a suitable branding temperature.

Figure 3:
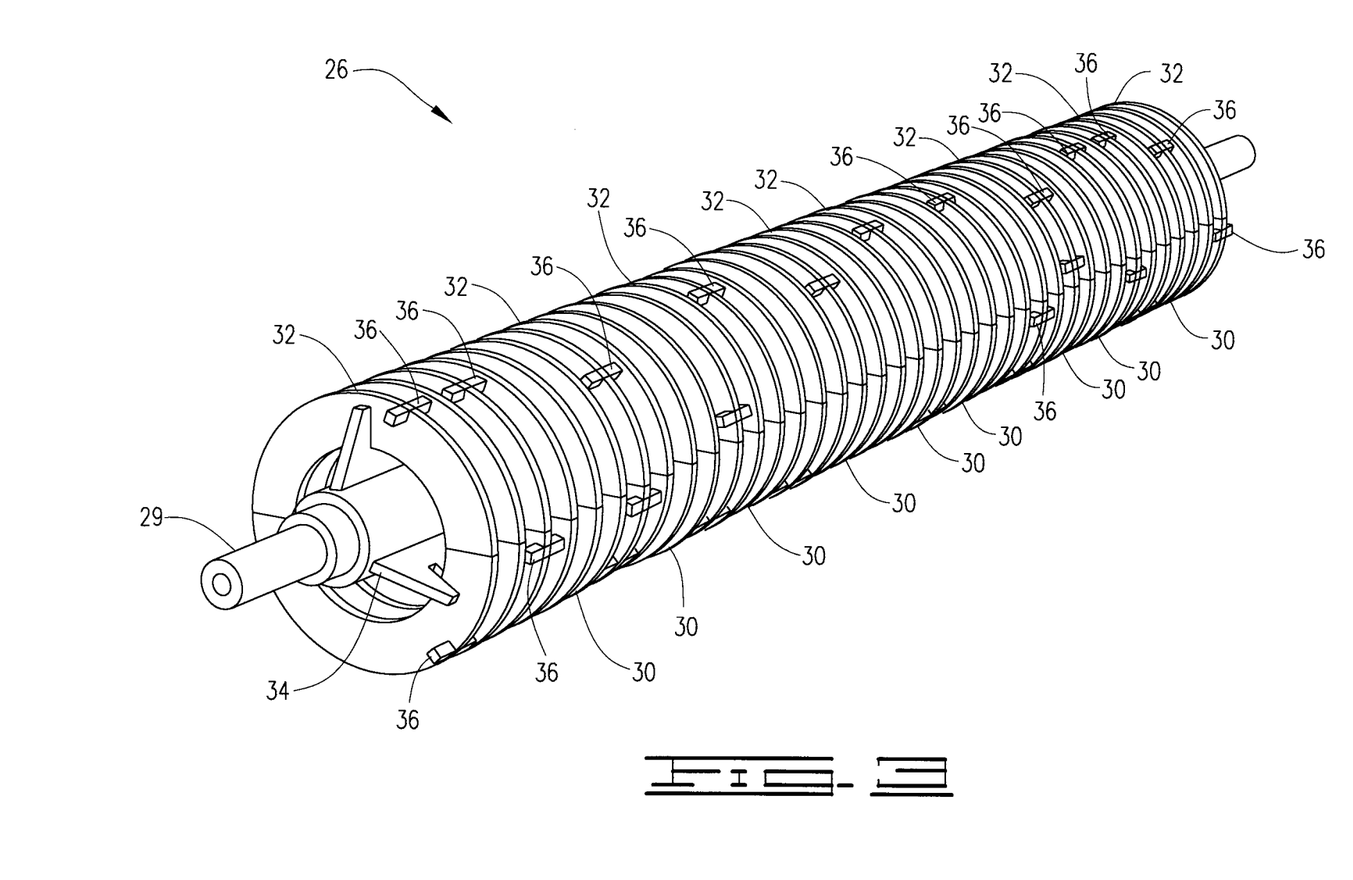
FIG. 3 is a perspective view of an inventive rotary brander element 26 employed in the combination searing and branding apparatus 4.

Although any type of rotary brander can be used in the brander/searer apparatus 4 employed in the inventive system 2, the rotary brander 26 employed in the brander/searer apparatus 4 will preferably be an inventive rotary brander of the type illustrated in FIG. 3. The inventive rotary brander 26 shown in FIG. 3 comprises: a brander shaft 29 which is mounted for rotation above the conveyor 22; a series of rings, discs, or other branding elements 30 extending in side-by-side relationship along the shaft 29 and having circular outer edges 32 for contacting the surface of the food product; a pair of end hubs 34 positioned on the ends of the shaft 29 for retaining the branding elements 30; and a plurality of branding pieces 36.

The branding pieces 36 are attached to at least some of the branding elements 30 at the outer edges 32 thereof such that the branding pieces 36 will also contact the food product surface to produce char marks thereon which are of one or more directional orientations different from the directional orientation of the char stripes produced on the product by the circular outer edges 32 of the elements 30. Although the branding pieces 36 can be of any size, shape, or desired orientation, the contacting edges of the branding pieces 36 will preferably be of a width in the range of from about 3 to about 6 mm and will also preferably be substantially perpendicular to the circular outer edges 32 of the branding elements 30 so that the char marks left by the branding pieces 36 will resemble the mark left by a cross piece of a typical barbecue grill.

The branding elements 30 of the inventive rotary brander 26 can be installed in fixed position on the shaft 29 or can be of the "free-floating" type so that (a) the elements are able to shift upwardly and downwardly to some degree to adapt to the shape profile of the food product and (b) some slippage of the branding elements 30 on the shaft 29 occurs during operation. In addition, each of the branding pieces 36 can be attached (a) to a single branding element 30, (b) between an adjacent pair of the branding elements 30, or (c) to three or more branding elements 30.

In order to produce variations in the char patterns branded on individual product pieces so that the product pieces have more of a random, home-style look, the branding pieces 36 will preferably be attached to the branding elements 30 at randomly selected locations. In addition, the branding elements 30 will preferably be of the "free-floating" type so that a sufficient degree of slippage occurs during operation to cause the rotational contact positions of some or all of the branding pieces 36 relative to the shaft 29 to change during operation. Also, to further facilitate the slippage of the branding elements 30 during operation to cause the desired changes in the rotational contacting positions of the branding pieces 36, each branding piece 36 will preferably be attached to only a single branding element 30.

During the operation of system 2 in accordance with the inventive method, food product pieces are conveyed through the searing and/or branding apparatus 4 wherein the surface of each product is (a) seared by the searing burner(s) 24 positioned above and/or below the conveyor 22 and/or (b) branded by the rotary brander 26 to produce char marks thereon. In addition, as the food product is seared and/or branded in the searing and/or branding apparatus 4, a searing and/or branding vapor product is also produced. The vapor product produced within the searing and/or branding apparatus 4 can comprise: vaporized fat, water, or other materials from the food products; smoke; air; and combustion products resulting, e.g., from the use of direct flame burners within the apparatus 4 for searing the product and/or heating a brander.

In the inventive apparatus and method, the extraction of the hot vapor product from the searing and/or branding apparatus 4 is preferably automatically controlled using controller 20 to maintain a desired temperature condition (preferably a selected temperature of the vapor product atmosphere) within the brander/searer housing 10. As a result, for any particular product being treated, and for any authentic surface color, degree of darkness, and/or flavor desired, the inventive apparatus and method desirably operate to ensure that a necessary amount of accumulated vapor product is always intentionally retained in the apparatus 4 to consistently maintain an optimum vapor temperature environment within the searing and/or branding apparatus 4 for achieving the result, but without exceeding the design temperature limits of the equipment.

I have discovered that, for at least most products, the optimum temperature environment, and thus also the amount of vapor product retention, within the searing and/or branding apparatus 4 for achieving a much more desirable authentic surface appearance and product flavor are significantly higher than the conditions heretofore experienced in the prior art systems and methods which have simply focused on the application of the high heat flame to the product surface.

Depending upon the particular product in question, the inventive system will preferably be controlled to automatically maintain a temperature in the upper vapor space of the brander/searer housing in the range of from about 340° to about 550° F. or above (preferably at least 350° F. and more preferably from about 350° to about 500° F.). The benefits which I have discovered are therefore completely unexpected and surprising when it is considered that (a) the product is already being directly exposed to much higher searing flame temperatures of 1000°-2000° F. and (b) during such exposure, the immediate product surface already reaches a temperature of up to 550° F. or more. In fact, the benefits achieved by intentionally targeting and controlling the vapor environment temperature in the brander/searer 4 are so unexpectedly pronounced that, for some products, optimum authentic results are surprisingly obtained by actually using fewer of the searing burners 24 in the apparatus 4 to apply flame to the product.

In the embodiment of the inventive system 2 shown in FIGS. 1 and 2, the controller 20 preferably receives an operating temperature input from one or more temperature sensors 38 and operates to control the determined temperature at a desired set point, or within a set point range, by automatically varying the speed of the extraction fan 14 installed in the vapor product conduit 8. The adjustment of the fan speed can be performed directly or indirectly by any desired manner known in the art. Alternatively, a constant speed fan could be employed and the controller 20 could be used, for example, to control a damper, valve, or other device within the vapor conduit 8 in order to vary the vapor extraction rate from the searing and/or branding apparatus 4.

The temperature sensor(s) 38 used in the inventive system will preferably be positioned so that they are effective for determining and controlling the vapor product temperature environment in the brander/searer 4, rather than being positioned for sensing the flame temperature of one or more of the apparatus burners 24 and 28. The sensor(s) 38 will preferably be positioned directly in the brander/searer housing 10 but can alternatively be positioned in the vapor product line to indirectly determine the internal oven temperature. The temperature sensor(s) 38 will most preferably be positioned in the upper interior vapor space 44 of the housing 10. The upper interior vapor space 44 of the brander/searer housing 10 is the region which is (a) above the elevation 46 of the flame discharge outlets of the upper searing burners 24 positioned over the conveyor 22, (b) preferably behind the plane 48 which extends through the discharge outlet of the brander burner 28 and is perpendicular to the discharge, and (c) also preferably outside of any upper burner covers 25 used in the brander/searer 4.

Thus, in contrast to the prior art searing and/or branding apparatuses wherein the vapor discharge from the searer/brander housing is simply always permitted to leave at a conservatively high flow in order to ensure that the equipment will not be damaged in the event that a significant operating fluctuation should happen to occur, the inventive system maintains a much more consistent, and typically significantly higher, operating product vapor environment temperature condition within the searing and/or branding apparatus 4. As a result, although the reasons for some of the surprising benefits provided by the inventive system are not understood with complete certainty, the inventive apparatus and method operate to (a) provide significantly enhanced, authentic surface searing, sealing, and branding effects, (b) provide significantly enhanced product searing and cooking consistency, (c) significantly improve the energy efficiency of the system, and (d) maintain a sufficiently high belt temperature in the brander/searer 4 (preferably at least 600° F. at the exit end of the apparatus) to ensure a nonstick product release.

In addition, the optimum searing and sealing of the product surface in accordance with the present invention operates to increase product yield by an amount in the range of from about 0.5 to about 5 weight percent and, in contrast to prior systems, operates to develop color, appearance, taste, and char-grilled highlights which are much closer to those of authentic home-cooked and grilled products which are prepared from scratch in a single apparatus.

In order to further fine tune the surface appearance and flavor effects provided by the brander/searer 4, the inventive brander/searer system 4 preferably also includes valving to control the oxygen/air and gas mix whereby the operation of the searer burners 24 can be manually or automatically adjusted such that the burners 24 will emit and maintain a burner flame having a targeted color. Using the color of the burner flame as a primary parameter for setting the output of the searing burners provides significant benefits. For example, a blue flame operating at from about 1600° to about 2000° F. will instantaneously sear the surface of a meat product whereas a yellow flame operating at from about 600° to about 1200° F. can be used to create a longer residence time in the flame environment for sugar caramelization in peppers and other products.

In the inventive system 2, all or a portion of the vapor product extracted from the searing and/or branding apparatus 4 can be delivered by the extraction fan 14 via the vapor conduit 8 to the interior of the cooking housing 12 of the oven 6. As mentioned above, the oven 6 can be located either downstream or upstream of the searing and/or branding apparatus 4 but is preferably located downstream of the apparatus 4 in order to capitalize on the benefits provided by searing and sealing the product prior to the cooking operation.

In addition, although any type of cooking oven can be used, the oven 6 employed in the inventive system 2 is preferably a spiral oven of the type illustrated in FIG. 1 having a spiral conveyor 40 for carrying the food product upwardly or downwardly through the oven housing 12 in a spiral pattern. The spiral conveyor 40 preferably carries the food product upwardly through the spiral oven housing 12 so that the juices produced from the cooked product pieces traveling along the upper tiers of the spiral conveyor will fall onto and baste the product pieces traveling along the lower tiers. Further, a spiral oven 6 is preferred for use in the inventive system 2 because it requires less floor space and provides cooking rate and interior flow characteristics and conditions which are surprisingly effective for continuously cooking the food product in the presence of the imported brander/searer product vapor to provide significant authentic flavor enhancement and further unexpected improvements in authentic surface appearance.

In the inventive system and method, the product carried by the spiral conveyor 40 through the housing 12 of the spiral oven 6 is cooked in the presence of some or all of the product vapor which is continuously produced in the searing and/or branding apparatus 4. The inventive system and method 2 therefore significantly improve the flavor and color development of the product which continues to occur in the oven 6 by allowing the product's own fats and juices from the searing and/or branding process to contact and caramelize around the food product while it cooks, apparently in much the same manner as would occur if the product were grilled or cooked from scratch in a single, non-continuous apparatus.

In addition, the inventive system 2 greatly improves the energy efficiency of the overall process by using the heat content of the imported hot searing and/or branding product vapor for cooking the food product in the oven 6, thus greatly reducing the demand which would otherwise be placed on the oven heating system. Consequently, in the inventive system and process 2, the oven heating system can be controlled to simply provide whatever supplemental heat is required to maintain a desired cooking temperature within the oven 6. In the event that either (a) the heat provided by the entire vapor product stream would cause the temperature within the oven 6 to exceed the desired cooking temperature and/or (b) it is desired to use less than the full searing/branding vapor product stream in the oven 6 in order to achieve a particular product flavor or appearance result, any desired portion of the product vapor stream from the searing and/or branding apparatus 4 can be discharged via the bypass duct 16 by manually setting or automatically controlling the bypass duct damper 18.

EXAMPLE 1

A brander/searer 4 of the type depicted in FIG. 2 was used for flame grilling jalapeño peppers. The brander/searer comprised: four upper blue ribbon searing burners 24 above the conveyor; four lower blue ribbon searing burners 24 below the conveyor; box-type burner covers 25 positioned over the upper searing burners; and an interior rotary brander 26 near the exit end of the apparatus.

When operated in accordance with the prior art without the inventive vapor environment temperature control system, the interior temperature at point 38 in the upper vapor space 44 of the apparatus 4 outside of the burner covers 25 fluctuates at around 325° F. with all eight of the searing burners, as well as the branding burner, in operation. Moreover, the prior art operation was unable to impart an acceptable authentic flame-charred flavor to the jalapeño product.

It was surprisingly discovered that the desired authentic flavor for the charred jalapeño product was only attainable in the continuous brander/searer 4 by implementing the inventive control system whereby the vapor product extraction rate was controlled to maintain a temperature of 450° F. at point 38 in the upper vapor space 44 of the apparatus 4 outside of the searing burner covers 25. Moreover, in addition to providing the otherwise unattainable authentic flavor result, the necessary residence time of the product in the brander/searer 4 was reduced sufficiently to increase the product production rate by more than 15%.

EXAMPLE 2

The brander/searer 4 described in Example 1 was used in conjunction with a spiral oven 6 as depicted in FIG. 1 for searing, branding, and cooking an array of food products. In each case, a truly authentic flavor and a truly authentic surface appearance were not obtainable without (a) implementing the inventive control system to determine, select, and maintain an optimal temperature in the interior vapor space 44 of the brander/searer 4 and (b) importing the extracted brander/searer vapor product into the oven 6.

Specifically, for the various products tested, it was surprisingly determined that outstanding authentic flavor and surface appearance results, as well as increased production rates, were attainable in the inventive system 2 when controlled as follows:

| Product | Brander/Searer Vapor Temp. (° F.) | Number of Searing Burners Used | Residence Time in Brander/Searer (seconds) |
| --- | --- | --- | --- |
| Brisket | 400 | 8 | 75 |
| Salmon Fillets | 350 | 2 | 60 |
| Rack of Lamb | 375 | 6 | 75 |
| Chicken Breasts | 400 | 1 | 75 |

Although the reasons for the surprising results achieved in Example 1 and Example 2 are not understood with complete certainty, it is believed that the inventive system operates such that, in one respect, the brander/searer vapor product imported into the continuous oven 6 was absorbed into and caramelized around the food product in the continuous spiral oven 6 in much the same manner as when cooking or grilling from scratch in a single batch apparatus. Also, because the inventive temperature control system operates to produce and maintain higher vapor product environment temperatures in the brander/searer 4 by, in effect, causing more vapor product to be retained in the apparatus 4, the inventive system may have also enhanced the degree of vapor product flavor absorption and surface treatment in the brander/searer 4 itself by, in part, increasing to some degree the pressure and density of the vapor product retained in the brander/searer 4.

Further, although the temperature of the immediate surface of the product already achieves a very high temperature when passing under and/or over each searing burner such that, in many if not all cases, the immediate surface temperature will exceed even the enhanced vapor space temperature provided and controlled by the present invention, the inventive system likely still produces surprisingly and unexpectedly improved surface and flavor results in the brander/searer 4 by reducing surface temperature fluctuations and losses which may otherwise occur as the product travels between the searing burners, thus causing a higher beginning temperature of the immediate outer surface of the product to be maintained and built upon as the product travels from one searing burner to the next, which apparently in turn provides improved searing and sealing performance.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A method of searing and cooking a food product comprising the steps of:
   (a) searing a surface of said food product by continuously delivering said food product through a searing apparatus, wherein in said step of searing a vapor product is also produced in said searing apparatus;
   (b) cooking said food product by continuously delivering said food product through an oven which is different from said searing apparatus; and
   (c) delivering at least a portion of said vapor product from said searing apparatus through a vapor conduit into said oven such that said food product is cooked in said oven in step (b) in an environment comprising at least a portion of said vapor product from said searing apparatus.

2. The method of claim 1 wherein said oven is a spiral oven having a conveyor which conveys said food product within said oven in a spiral pattern.

3. The method of claim 1 wherein said step of delivering comprises a step of extracting at least a portion of said vapor product from said searing apparatus at an extraction rate which is automatically controlled to maintain a selected temperature condition of said vapor product.

4. The method of claim 3 wherein said temperature condition of said vapor product is a temperature of said vapor product in a vapor conduit extending from said searing apparatus.

5. The method of claim 3 wherein, in said step of extracting, at least a portion of said vapor product is extracted from said searing apparatus using an extraction fan and said temperature condition of said vapor product is maintained by automatically controlling a speed of said extraction fan.

6. The method of claim 3 wherein:
   said searing apparatus comprises a housing, a conveyor extending through said housing, and at least one searing burner positioned in said housing and having a discharge outlet at an elevational position above said conveyor for discharging heat downwardly toward said food product, and
   said temperature of said vapor product is a temperature within said housing above said elevational position.

7. The method of claim 6 wherein said searing burner is a blue ribbon flame burner which discharges a flame downwardly toward said food product.

8. The method of claim 6 wherein said searing burner is a gas infrared burner.

9. The method of claim 3 further comprising the step of selecting said selected temperature condition of said vapor product to produce a desired degree of darkness of said surface, a desired color of said surface, a desired flavor of said food product, or a combination thereof.

10. The method of claim 9 wherein said selected temperature condition of said vapor product is a temperature of said vapor product in a range of from about 340° to about 550° F.

11. The method of claim 1 further comprising the step of branding said food product in said searing apparatus to produce char marks on said surface of said food product.

12. A method of branding and cooking a food product comprising the steps of:
   (a) branding a surface of said food product to produce char marks thereon by continuously delivering said food product through a branding apparatus, wherein in said step of branding a vapor product is also produced in said branding apparatus;
   (b) cooking said food product by continuously delivering said food product through an oven which is different from said branding apparatus; and
   (c) delivering at least a portion of said vapor product from said branding apparatus through a vapor conduit into said oven such that said food product is cooked in said oven in step (b) in an environment comprising at least a portion of said vapor product from said branding apparatus.

13. The method of claim 12 wherein said oven is a spiral oven having a conveyor which conveys said food product within said oven in a spiral pattern.

14. The method of claim 12 wherein said step of delivering comprises a step of extracting at least a portion of said vapor product from said branding apparatus at an extraction rate which is automatically controlled to maintain a selected temperature condition of said vapor product.

15. The method of claim 14 wherein said temperature condition of said vapor product is a temperature of said vapor product in a vapor conduit extending from said branding apparatus.

16. The method of claim 14 wherein, in said step of extracting, at least a portion of said vapor product is extracted from said branding apparatus using an extraction fan and said temperature condition of said vapor product is maintained by automatically controlling a speed of said extraction fan.

17. The method of claim 14 wherein said surface of said food product is branded in step (a) using a rotary brander positioned in said branding apparatus.

18. The method of claim 17 further comprising the step of searing said surface of said food product in said branding apparatus.

19. The method of claim 17 wherein:
   said branding apparatus comprises a housing, a conveyor extending through said housing, and at least one burner positioned in said housing for discharging heat in a discharge direction toward said rotary brander and
   said temperature condition of said vapor product is a temperature within said housing behind a plane which extends through a discharge outlet of said burner perpendicular to said discharge direction.

20. The method of claim 14 further comprising the step of selecting said selected temperature condition of said vapor product to produce a desired degree of darkness of said surface, a desired color of said surface, a desired flavor of said food product, or a combination thereof.

21. The method of claim 20 wherein said selected temperature condition of said vapor product is a temperature of said vapor product in a range of from about 340° to about 550° F.

22. A method of searing a food product comprising the steps of:
   (a) searing a surface of said food product by continuously delivering said food product through a searing apparatus comprising a conveyor which conducts said food product through said searing apparatus and at least one searing burner positioned in said searing apparatus adjacent to said conveyor which discharges heat toward said food product;
   (b) extracting from said searing apparatus, at an extraction rate, a vapor product produced in step (a) via a vapor conduit; and
   (c) automatically controlling said extraction rate to maintain a selected temperature condition of said vapor product.

23. The method of claim 22 wherein said selected temperature condition of said vapor product is a temperature of said vapor product in said vapor conduit.

24. The method of claim 22 wherein said selected temperature condition of said vapor product is a temperature within said searing apparatus.

25. The method of claim 24 wherein said searing burner has a discharge outlet positioned at an elevation above said conveyor for discharging said heat downwardly toward said food product and said selected temperature condition of said vapor product is a temperature above said elevation.

26. The method of claim 22 further comprising the step of branding said surface of said food product by contacting said surface of said food product with a brander positioned in said searing apparatus.

27. The method of claim 22 wherein, in said step of extracting, at least a portion of said vapor product is extracted from said searing apparatus using an extraction fan and said selected temperature condition of said vapor product is maintained in step (c) by automatically controlling a speed of said extraction fan.

28. The method of claim 22 further comprising the step of selecting said selected temperature condition of said vapor product to produce a desired degree of darkness of said surface, a desired color of said surface, a desired flavor of said food product, or a combination thereof and said selected temperature condition of said vapor product is a temperature of said vapor product in a range of from about 340° to about 550° F.

* * * * *